United States Patent [19]

Ancker et al.

[11] Patent Number: 4,661,537

[45] Date of Patent: Apr. 28, 1987

[54] IMPACT PROMOTERS FOR MINERAL-FILLED THERMOPLASTICS

[75] Inventors: Fred H. Ancker, Warren; Arnold C. Ashcraft, Jr., Millstone Township, Mercer County, both of N.J.

[73] Assignee: Union Carbide Corporation, Danbury, Conn.

[21] Appl. No.: 753,976

[22] Filed: Jul. 11, 1985

[51] Int. Cl.$^4$ .............................................. C08K 9/00
[52] U.S. Cl. .................................. 523/200; 524/145; 524/437; 524/585; 524/586; 524/587
[58] Field of Search ............... 524/585, 586, 587, 145, 524/437; 523/200

[56] References Cited

U.S. PATENT DOCUMENTS

| | | | |
|---|---|---|---|
| 4,198,310 | 4/1980 | Lyons et al. | 524/146 |
| 4,219,607 | 8/1980 | Cammack et al. | 524/145 |
| 4,385,136 | 5/1983 | Ancker et al. | 523/215 |
| 4,409,342 | 10/1983 | Ancker et al. | 523/202 |
| 4,430,468 | 2/1984 | Schumacher et al. | 524/145 |

FOREIGN PATENT DOCUMENTS 1395780  5/1975  United Kingdom ................ 524/437

OTHER PUBLICATIONS

Chem Abs. 101(8)55925q 1984, Vick et al.
"Void Nucleation of Particulate Filled Polymeric Materials" pp. 46–48, 34th Annual Technical Conference of the Society of Plastics Engineers, Boston, May 4–7 (1981).
"A Method of Improving the Fracture Toughness of Fibre Reinforced Composites" Jones, et al MIT.
"Lost Cost Highly Filled Impact Resistant Thermoplastic Composites", de Souza et al, 37th Annual Technical Conference, Society of Plastics Engineers, New Orleans, La., May 7–10, 1979, Preprint pp. 492–496.
Surface Modification of Calcium Carbonate for Polymer Composites", T. Nakatsuka, *Molecular Characterization of Polymer Composites*, H. Ishida and G. Kumar (ed.), New York (Plenum Press), 1985.
"Strain-Rate Sensitive Tough Fibre-Reinforced Composites" J. of Materials Science vol. 12, pp. 239–250 (1977).
"The Theory of Organo Titanate Coupling Agents", S. J. Monte, 34th Annual Technical Conference, Society of Plastic Engineers, Atlantic City, N.J. Apr. 26–27, 1976 Preprint pp. 27–34.
"The Application of Titanate Coupling Agents", G. Sugarman, et al., 34th Annual Technical Conference, Society of Plastics Engineers, Atlantic City, N.J. Apr. 26–27, pp. 35–39.
"Low Cost Filler-Coupling Agent for Polyolefins", D. Stevenson, et al 36th Annual Conference of the Reinforced Plastics/Composites Inst., Society of the Plastics Industry, Washington, D.C., Feb., 16–20, 1981 Session 9-B Preprints pp. 1–4.

*Primary Examiner*—Herbert J. Lilling
*Attorney, Agent, or Firm*—Paul W. Leuzzi

[57] ABSTRACT

A mineral-filled thermoplastic composition is disclosed which comprises polyethylene or an ethylene-vinyl acetate copolymer; a mineral filler consisting, in the case of polyethylene, of aluminum trihydrate, magnesium hydrate, calcium carbonate or calcium/magnesium carbonates, and, in the case of the ethylene-vinyl acetate copolymer, barium titanite or neodymium titanate; and, in the case of polyethylene, an impact promoter consisting of tri(2-ethylhexyl) phosphate, isostearic acid or dodecylpyridinium salts, the selection of the impact promoter being dependent upon the mineral filler being employed, and, in the case of the ethylene-vinyl acetate copolymer, an amount of isostearic acid sufficient to increase the ductility of the composition; also disclosed is an additive composition for a thermoplastic composition which comprises a hydrophobic agent and an impact promoter.

16 Claims, No Drawings ics is discussed in more detail by L. C. Cessna in the article entitled "Dilatometric Studies of Polymers Undergoing High and Low Rate Tensile Deformation", Polymer Engineering and Science, Vol. 14, #10, p. 696–701 (1974), and the references quoted therein.

IMPACT PROMOTERS FOR MINERAL-FILLED THERMOPLASTICS

FIELD OF THE INVENTION

This invention relates to mineral-filled thermoplastic polymer compositions containing an impact promoter.

BACKGROUND OF THE INVENTION

The use of mineral fillers for thermoplastic polymer compositions is well known in the art. Such filler compositions are typically used to improve certain physical properties of the matrix polymer. Since mineral fillers often are as costly on a volume basis as the low cost resins such as the polyolefins, fillers are mostly used for the purpose of creating new materials of increased value, due to the altered physical properties as compared to the unfilled polymer matrix.

The filled thermoplastic polymers typically are comprised of the matrix polymer, a mineral filter, and an interface agent. Of importance then is the combination of properties that can be achieve for a given polymer/filler/interface agent system, such combination of properties typically being referred to as a property profile. The property profile thus determines the practical utility of the filled plastic.

The mineral fillers when incorporated into ductile plastics have some benficial effects with respect to certain physical properties of the filled material while also causing some adverse effects on other aspects of the property profile of the composite material. In general, the addition of mineral fillers increase stiffness, as measured by tensile modules and flexural modulus, while decreasing elongation at break, otherwise known as ductility, and impact strength, as measured by the notched Izod test. Such decreases in the ductility and impact strength are often severe. The strength properties which result from the addition of a mineral filler to a thermoplastic material may increase or decrease depending upon a number of factors.

Certain interface agents can dramatically improve the property profile of individual polymer/filler systems by lessening the deleterious effects of the filler while preserving the improvements in other properties, such as tensile modulus and flexural modulus. It is also sometimes possible to minimize by the use of certain interface agents, the adverse effects of the environment on a given composition, such as to improve its retention of properties after exposure to water, high temperature, and/or actinic radiation.

For a general background on the physical properties of polymeric materials, with and without particulate fillers, reference is made to the book by Lawrence E. Nielsen entitled "Mechanical Properties of Polymers and Composites", New York (Marcel Dekker) 1974, particularly to chapters 5 and 7, and to the appended bibliography. The specific question of how to simultaneously achieve high modulus, high ductility and impact strength in thermoplastics is discussed in more detail by L. C. Cessna in the article entitled "Dilatometric Studies of Polymers Undergoing High and Low Rate Tensile Deformation", Polymer Engineering and Science, Vol. 14, #10, p. 696–701 (1974), and the references quoted therein.

The foregoing studies suggest that microcavitation, i.e., microvoid formation during deformation, can result in an enormous increase in the internal surface area during deformation, and that this may be the predominant energy-absorbing mechanism even for unfilled, high modulus, ductile polymer systems at the high strain rates typical of impact testing. For studies of microcavitation in filled systems, further reference is made to the articles by Nam P. Suh et al. entitled "Strain-Rate Sensitive Tough Fibre-Reinforced Composites", J. of Materials Science, Vol. 12, pp. 239–250 (1977), and "Void Nucleation of Particulate Filled Polymeric Materials," pp. 46–48 of the preprints from the 34th Annual Technical Conference of the Society of Plastics Engineers, Boston, May 4–7, 1981, and the references cited therein. These papers show that interposing a liquid (e.g., silicone grease) interface between a matrix resin and fibers or particular fillers, respectively, can indeed increase the toughness of these composites by facilitating the formation of microvoids. However, the authors clearly recognized the limitations of the approach by stating on page 250 of the former article that the viscous coating reduces the static properties of the composite such as its tensile and flexural strengths and suggested that the concept could best be utilized where the amount of one time energy absorption is the primary design parameter. The approach was useful for products which must be able to resist one impact event only without catastrophic failure, although the material has been damaged to the extent that it will not withstand a second event. Examples of such specialty applications were safety related products such as highway guard rails, safety helmets and circuit breaker boxes.

For a more general discussion of the different types of interface agents and their use in the prior art, reference is made to U.S. Pat. Nos. 4,385,136, issued May 24, 1983, entitled "Reinforcement Promoters for Filled Thermoplastic Polymers" and 4,409,342, issued Oct. 11, 1983, entitled "Synergistic Reinforcement Promoter Systems for Filled Polyolefins" and to the references quoted therein. Effective interface agents for mineral-filled thermoplastics fall into two broad categories, namely those that are chemically active and those that have no chemical groups capable of reaction with the matrix polymer. The first type is believed to work by a mechanism whereby the polymer interphase region surrounding each filler particle is chemically modified by the interface agent so that it becomes considerably tougher than the original matrix resin. The second type, on the other hand, is believed to debond the filler particles from the matrix resin, thus sometimes increasing the toughness by facilitating microcavitation, but usually at a severe sacrifice in both strength and stiffness. Actually, most additives that are presently used as dispersing and processing aids, i.e. most lubricants and surfactants, have only very minor effects on the mechanical properties of the filled polymer.

Many evaluations of additives for filled polymers described in the prior art are misleading because the data are incomplete or misinterpreted. For example, some additives act as plasticizers and thus reduce the stiffness of a given filled thermoplastic by softening the matrix which often is an undesirable effect. On the other hand, an increase in stiffness can be an indication of filler agglomeration—i.e. poor dispersion—hence, a high modulus is not necessarily a beneficial result for a particular additive agent as explained further below. In contrast, since agglomeration invariably reduces the tensile strength because poorly dispersed fillers cause large flaws, a high tensile strength is always a beneficial interface effect. The property profile which is important for practical utility is a combination of improved impact and ductility, unchanged or only slightly reduced strength and stiffness, and good retention of these properties after environmental exposure to moisture, heat or sunlight. This property combination is also the most difficult one to achieve, especially with interface agents that are incapable of chemical interactions with the matrix resin.

The relationship between particle aggregation and viscosity of suspensions was studied by T. B. Lewis and Lawrence Nielsen and reported in the Transactions of the Society of Rheology, Vol. 12, pp. 421-443 (1968). According to these studies, the viscosity of liquid dispersions (and similarly, the modulus of filled, solid polymers) decreases with improvements in the dispersion of particular fillers. The reason for this is that part of the liquid (or plastic matrix) is entrapped in the interstitial spaces in an agglomerate, hence reducing the amount of free liquid (plastic solid) available for the particles to move in. As the agglomerates are broken down, mechanically and/or by the action of dispersing agents, more liquid (solid) becomes available for the particles to move in and the viscosity (modulus) decreases.

The strength of a material is a statistical property in that the size and distribution of defects or flaws in the specimen determine the magnitude of loading a given sample can withstand before failure. For this reason, large filler particles quite generally result in lower composite strength than smaller ones, and in case of undispersed and mechanically weak agglomerates, the phenomenon is aggravated by the possible breakage of the agglomerates themselves.

Because of the complex mechanisms described above, the practical utility of a potential interface agent requires a quite complete evaluation of the physical property profile of the filler/polymer system in which it is used. Most studies reported in the literature are very incomplete in this respect and considerable caution must therefore be exercised in accepting the statements of the authors.

For a perspective on the prior art for non-reactive interface agents, reference is made to some recent survey articles. Organic titanates have been reviewed extensively by S. J. Monte, G. Sugarman et al. in two papers entitled "The Theory of Organo Titanate Coupling Agents" and "The Application of Titanate Coupling Agents", pp. 27-34 and p. 35-39, respectively, in the preprints of the 34th Annual Technical Conference of the Society of Plastics Engineers, Atlantic City, N.J. Apr. 26-29, 1976. Chlorinated paraffins have been reviewed in a paper entitled "Low Cost Filler-Coupling Agent for Polyolefins" by D. Stevenson et al., pp. 1-4 of the preprints for session 9-B of the 36th Annual Conference of the Reinforced Plastics/Composites Institute of the Society of the Plastics Industry, Washington, D.C., Feb. 16-20, 1981. An organic interface agent of undisclosed composition has been discussed by de Souza et al. in a paper entitled "Low Cost Highly Filled Impact Resistant Thermoplastic Composites," pp. 492-496 in the preprints of the 37th Annual Technical Conference of the Society of Plastics Engineers, New Orleans, La. May 7-10, 1979. A detailed overview of surface treatments and preparation techniques for calcium carbonate is presented in an article by T. Nakatsuka entitled "Surface Modification of Calcium Carbonate for Polymer Composites", published in H. Ishida and G. Kumar (ed.), "Molecular Characterization of Polymer Composites", New York (Plenum Press), 1985.

Non-reactive interface agents have some important advantages over the chemically reactive agents referred to above. First, precisely because the chemically non-reactive agents act by physical means only, they are generally much less sensitive to differences in processing conditions, thus making the same composite formulation usable for many different fabrication processes. Second, they are for the same reason generally very low in toxicity, which has advantages both in handling and in certain, critical applications of filled polymers. Third, in contrast to the chemically reactive agents, which usually do not give additive effects by simple combination with a non-reactive agent, all non-reactive species can often be combined with themselves with beneficial results: for example, highly hydrophobic interface agents will usually convey improved moisture resistance to a filled polymer when substituted for part of a less hydrophobic impact promoter without significant sacrifice in the other physical properties.

As polyethylene is one of the most widely used low cost resins, a need continually exists for improving the property profile of polyethylene based resins. It has been well known to use mineral fillers in combination with a polyethylene-type matrix polymer to increase its tensile modulus and flexural modulus. However, to date, there continues to exist a need for non-reactive interface agents, generally, and in particular for non-reactive interface agents which are capable of increasing the impact strength of such mineral-filled polyethylenetype resins while not substantially adversely affecting the strength and modulus of the filled polyethylene-type resin. The need continues to exist, in part, because of the lack of predictability of the efficacy of any individual non-reactive interface agent when combined with any particular combination of resin and filler.

One may refer, for example, to U.S. Pat. No. 4,385,136, which in Table III, Columns 11 and 12, lists a dozen typical, non-reactive chemicals. The subsequent examples demonstrate that such chemicals when used as additives in filled polyolefins typically do not provide composite materials with attractive and useful property profiles. For example, Example 1, Table 1, Column 19 shows that isopropyl tri-isostearyl titanate severely reduces strength, stiffness and impact, while increasing ductility in aluminum trihydrate filled polyethylene. As another illustration, Example 3, Table 3, Column 20, demonstrates that iso-stearic acid, while improving the impact strength, has little effect on the strength, stiffness, and ductility over a control sample without such an additive, in clay filled high density polyethylene.

An object of the present invention is to provide non-reactive impact promoters which are useful in conjunction with certain combinations of mineral fillers and resins.

Another object of the present invenlion is to provide non-reactive impact promoters which are useful in increasing the impact strength of certain mineral filled resins, when compared to the same compositions without said promoter.

Additionally, an object of the present invention is to provide a method for improving the impact strength of a mineral filled resin composition without substantially impairing the strength and modulus of said composition.

A further object of the present invention is to provide a method for concurrently reducing the moisture sensitivity of a mineral-filled resin composition while improving the impact strength of said composition, without substantially impairing the strength and modulus of the composition.

SUMMARY OF THE INVENTION

In accordance with the present invention there have now been discovered certain mineral-filled thermoplastic compositions comprising a polymer selected from the group consisting of polyethylene and ethylene-vinyl acetate copolymers; an appropriate mineral filler selected from the group consisting of aluminum trihydrate, magnesium hydrate, calcium carbonate, calcium/magnesium carbonates, barium titanate and neodymium titanate; and a sufficient amount of an appropriate impact promoter selected from the group consisting of tri (2-ethylhexyl) phosphate, isostearic acid, and dodecylpyridinium salts, to increase the impact strength of the composition when compared to the same composition without said promoter being present.

There has also been discovered a method for improving the impact strength of a composition wherein said composition comprises a polymer selected from the group consisting of polyethylene and ethylene-vinyl acetate copolymers, and an appropriate mineral filler selected from the group consisting of aluminum trihydrate, magnesium hydrate, calcium carbonate, calcium/magnesium carbonates, barium titanate and neodymium titanate, said method comprising incorporating into said composition a sufficient amount of an appropriate impact promoter selected from the group consisting of tri (2-ethylhexyl) phosphate, isostearic acid, and dodecylpyridinium salts, to improve the impact strength of said composition without substantially impairing the strength or modulus, as compared to the same composition without said impact promoter.

Surprisingly, it has been found that there is a great deal of selectivity with respect to the choice of an impact promoter for any particular polymer/filler combination. Thus, when the polymer is polyethylene and the filler is aluminum trihydrate or magnesium hydrate, the appropriate impact promoter is tri (2-ethylhexyl) phosphate. When the polymer is polyethylene and the filler is calcium carbonate or a calcium/magnesium carbonate, the appropriate impact promoter is either isostearic acid or a dodecylpyridinium salt. Finally, when the polymer is an ethylene-vinyl acetate copolymer and the filler is barium titanate or neodymium titanate, the appropriate impact promoter is isostearic acid.

In accordance with another aspect of the present invention, it has been found that certain mineral-filled thermosplastic compositions can have their impact strength improved in accordance with the aforementioned invention, while also having their sensitivity to moisture reduced by incorporating into said composition a sufficient amount of an appropriate impact promoter to improve the impact strength of said mineral-filled composition and a sufficient amount of a hydrophobic agent to cause a reduction in moisture sensitivity, as compared to the same mineral-filled composition without said impact promoter and hydrophobic agent. Advantageously, such a combined effect of improvement in impact strength and reduction in moisture sensitivity can be achieved for the particular mineral-filled compositions specified herein with an additive composition comprising a hydrophobic agent and an impact promoter selected from the group consisting of tri (2-ethylhexyl) phosphate, isostearic acid, and dodecylpyridinium salts, wherein the weight ratio of hydrophobic agent to impact promotor is from about 1:20 to about 1:1.

DETAILED DESCRIPTION OF THE PREFERRED EMBODIMENTS

As suggested above, one of the findings of the present invention is that certain combinations of non-reactive interface agents, sometimes referred to herein as impact promoters, along with certain mineral fillers are effective in producing certain thermoplastic compositions having improved property profiles, especially increased impact strength, as measured by the notched Izod test, without substantially impairing the strength or modulus, as compared to the same composition without said impact promoter. One of the surprising aspects of the present invention was the finding that the efficacy of the particular interface agents is highly dependent upon the particular combination of both filler and polymer type. Thus, it has been found that an interface agent which is useful in conjunction with one particular type of mineral filler, such as calcium carbonate or calcium/magnesium carbonates, and one particular polymer, such as polyethylene, may not be, and probably will not be, effective for a different mineral filler such as clay or talc and the same polymer, or for the same filler type and a different polymer, such as polypropylene. The reason for the selectivity of the particular interface agent and the particular filler/resin systems is not understood or predictable, at the present state of the art.

The polyethylenes used in the present invention are the normally solid grades of polyethylene and the nonpolar copolymers of ethylene with other hydrocarbon monomers such as propylene, butene, hexene, neohexene and 4-methyl pentene. The polyethylene may further contain residual unsaturation enabling subsequent curing or cross-linking as can be achieved, for example, by co- or terpolymerization with diene monomers such as ethylidene norbornene.

Specifically preferred are the commercially available, normally solid, grades of polyethylene. A preferred grade is high-pressure, low-density polyethylene having a density of about 0.91 to about 0.94 and a melt index of about 0.1 to about 50. Another preferred polyethylene is linear, low-density polyethylene having a density of about 0.90 to about 0.94 and a melt index os about 0.01 to about 50. A most preferred polyethylene is high-density polyethylene having a density of about 0.94 to about 0.97 and a melt index of about 0.01 to about 50, preferably 0.05 to 10.

The ethylene-vinyl acetate copolymers used in the present invention are the normally solid copolymers of ethylene with vinyl acetate, wherein the vinyl acetate content is from about 2 to about 50 percent, usually from about 5 to about 40 percent, by weight.

The mineral fillers which are useful in the present invention, as stated above, are aluminum trihydrate, magnesium hydrate, calcium carbonate, calcium/magnesium carbonates, barium titanate and neodymium titanate. Illustrative of carbonate mineral fillers are the natural calcite, dolomite, and limestone products (calcium and magnesium carbonates) which may be ground or provided in precipitated ("synthetic") forms. The amount of mineral filler, by weight, present in any composition of the present invention is usually from about 5 to about 85 percent, typically from about 10 to about 65 percent.

The non-reactive interface agents which are useful as impact promoters in the context of the present invention are tri(2-ethylhexyl) phosphate, isostearic acid, and dodecylpyridinium salts. The dodecylpyridinium salts which are useful in the present invention include dodecylpyridinium halides, such as dodecylpyridinium chloride, as well as dodecylpyridinium sulfate, dodecylpyridinium acetate, and other known salts.

The amount of impact promoter present in any given composition, should be sufficient to increase the impact strength of the composition, when compared to the same composition without said promoter being present. The impact promoters of the present invention can thus substantially increase the impact strength of the specific mineral-filled compositions. A substantial increase in impact strength can be determined by considering the notched Izod values of the mineral-filled compositions, both with and without the presence of the impact promoters.

Materials having notched Izod values equal to or less than 0.5 ft. lbs. per inch of notch are sufficiently brittle so that they will crack upon falling from table height onto a hard floor. Materials having notched Izod values of about 1 ft. lb. per inch of notch are commonly recognized as being "non-brittle", although perhaps not quite considered "tough". Materials having notched Izod values around 2 ft. lbs. per inch of notch will normally withstand being dropped onto a hard floor from table height. Materials having notched Izod values equal to or greater than 5 ft. lbs. per inch of notch are difficult to break when hit with a hammer. A "substantial improvement in impact strength" is thus one which is noticeable within the foregoing practical scale.

It is an especially advantageous feature of the present invention that the impact promoter, when selected in accordance with the present invention and used in a suitable amount, will have the aforementioned beneficial result on impact strength without substantially impairing the strength or modulus, as compared to the same composition without said promoter. A substantial impairment of strength or modulus would be indicated by a greater than one-third reduction of both strength and stiffness values, as compared to the same mineral-filled composition without the interface agent. Because non-reactive interface agents act by the mechanism of microcavitation, such reductions in the static properties imply that the material might fail in some practical applications, due to reduced strength or due to excessive creep, under long-term static loads.

Usually, the promoter will be present in an amount, based upon the weight of the filler, from about 0.5 to about 10 percent, typically about 1 to about 5 percent.

In an embodiment of the process of the present invention, the impact promoters may be admixed with the filler by stirring the promoter with the filler, using a solution containing a solvent which is allowed to evaporate before compounding the filler into the thermoplastic polymer. This is done to assure uniformity of distribution for the various impact promoters onto the fillers since the chemicals vary greatly in physical form, i.e., liquid vs. solid, in viscosity, melting point and the like. In practice, less expensive methods are preferred. These methods would include the impact promoter being used as a filler pretreatment, e.g., from an aqueous dispersion by spray-tumbling in a ribbon blender; by mechanically mixing the promoter at high shear as a liquid or solid which is predispersed or dissolved in other ingredients, if any; by direct addition of the promoter to the resin and filler before or during compounding; or as a concentrate in the polymer.

The filler and impact promoter may be dispersed in the polymer by processes such as banburying, milling, extrusion-including twin screw extrusion and the like. The hydrophobic agents may likewise be added in a manner similar to that described above for the impact promoters.

The hydrophobic agents used in the present invention, as indicated, may be present in an amount which is sufficient to reduce the moisture sensitivity of the composition. Moisture sensitivity of a composition is usually shown, for example, by loss of mechanical properties upon exposure to moisture, as water or water vapor. A typical result of moisture sensitivity would be embrittlement of the composition upon exposure to moisture. The hydrophobic agents of the present invention thus reduce the tendency of the compositions to lose mechanical properties upon exposure to moisture.

In the context of this invention, a hydrophobic agent is defined as a chemical with a non-polar moiety having a polarity lower than that of polyethylene. The polarity of a moiety can be calculated in terms of the Hildebrand solubility parameter by the method of group contributions; see, for example, D. W. Van Krevelen, Properties of Polymers, 2nd Edition, Amsterdam/New York (Elsevier), 1976. Since there is some variation in values for group contributions (F-value=molar attraction constant) and in molar volumes ($cm^3$/mole) among different authors, those of Van Krevelen in tables 4.4, page 56 and Table 7.2, page 134 are specified.

Furthermore, since tetravalent silicon is not listed in the tables discussed above, the values for this group are listed below:

| Group: | $-\overset{\vert}{\underset{\vert}{Si}}-$ |
| --- | --- |
| Molar Attraction Constant: | 64 $Joule^{\frac{1}{2}} \cdot cm^{3/2}$ per mole = 32 $cal^{\frac{1}{2}} \cdot cm^{3/2}$ per mole |
| Molar Volume: | 29.1 $cm^3$/mole |

Among moieties having solubility parameters lower than that of polyethylene—which is 8.3 $cal^{\frac{1}{2}} \cdot cm^{-3/2}$—are trimethyl silyl, dimethyl siloxyl, poly(dimethylsiloxane), perfluoromethyl, poly(tetrafluoroethylene), isobutenyl, poly(isobutene), butadienyl, poly(butadiene), etc.

The hydrophobic agent may have a hydrophilic moiety which can be ionic or non-ionic. Typical anionic groups are carboxylate, sulfonate, phosphate, and the like, while typical cationic groups may be amines or quaternized ammonium. Examples of nonionic groups are ethers, alcohols and esters, e.g. ethylene oxide, carbohydrates, etc. However, the original hydrophobic agent need not contain such hydrophilic moieties since they can be formed by oxidation during the hot compounding operation of the filled thermoplastic polymer. Of particular utility are hydrophobic agents as discussed above, which are either organosilicon based or organofluorine based.

The hydrophobic agents used in the present invention are usually present in combination with the impact promoters of the present invention such that from about 5 to about 50 percent of the combination is the hydrophobic agent and from about 50 to about 95 percent of the combination is the impact promoter. Preferably, the weight ratio of the hydrophobic agent to the impact promoter is from about 1:1 to about 1:9, more preferably about 1:4 to about 1:9.

The present invention will be further described by the following examples which are for the purpose of further illustrating the present invention and are not intended to be a limitation thereon.

PREPARATION OF THE SAMPLES

Except as otherwise indicated, in all of the following examples, the filler pretreatment procedure consisted of dissolving about 10 g of impact promoter in enough solvent, e.g., acetone, to dissolve the promoter, but less than the amount of solvent which would produce a paste with the wetted filler. The promoter solution was then added to 500 g of filler, blended mechanically and air dried overnight.

The pretreated filler was compounded with 250 g of thermoplastic polymer on a 6" by 12" 2-roll mill at 180° C. by adding 250 g of pretreated filler incrementally to the fluxed polymer. Mixing was continued using thorough compounding procedures. A sheet of the treated, filled polymer was then cut and rolled into a cylindrical bar, i.e. "pig", and then passed end-wise through the compounding mill about ten times for a total mixing time of ten minutes after the filler had been added. The product composition was then sheeted off the mill, allowed to cool to room temperature and granulated in a granulator.

TESTING OF THE SAMPLES

The following testing procedures were used for each product composition. The granulated product composition was injection molded at a melt temperature of 215° C. using a 38 cm$^3$ capacity, 30 ton reciprocating screw-injection machine with a mold providing an ASTM dog bone test bar with dimensions of 2" by ⅛" by ⅛" for testing tensile properties, and a rectangular bar with dimensions of 5" by ½" by ⅛" for testing flexural properties. The following tests were used for each product composite:

| Property Tested | Abbrev. | ASTM Test Units | Designation |
| --- | --- | --- | --- |
| Tensile Strength | TS | psi | D638-76 |
| Tensile Modulus | TM | ksi | D638-76 |
| Elongation at Break | EB | % | D638-76 |
| Flexural Strength | FS | psi | D790-71 |
| Flexural Modulus | FM | ksi | D790-71 |
| Notched Izod Impact Strength | IZOD | ft. lbs./in. | D256-73 |
| Heat Distortion Temperature | HDT | °C. (264 psi) | D648-72 |

During the tension and flexural tests a cross-head speed of 0.2" per minute was utilized.

DEFINITIONS

The chemical designations used in the examples are defined as follows:

| Designation | Description |
| --- | --- |
| ATH | Aluminum Trihydrate having an average particle size of 0.3 to 1.0 μm and a surface area of 6 to 15 m$^2$/g. |
| BaTiO$_3$ | Barium titanate in the form of a finely ground ceramic powder having a maximum particle size of 1.0 μm. |
| CaCO$_3$ | Calcium Carbonate consisting of finely ground limestone having 93 to 96 percent Calcium Carbonate in the form of Calcite having an average particle size of 3.5 μm |
| Clay | An unmodified hard clay consisting of hydrous kaolinite with a mean particle size of 0.3 μm and a surface area of 20 to 24 m$^2$/g. |
| CSTA | Calcium Stearate |
| DDPC | Dodecyl Pyridinium Chloride |
| EDMS | Ethoxylated Poly(Dimethyl Siloxane) |
| EVA | A copolymer of ethylene and vinyl acetate containing 75 and 25 wt % of the two monomers, respectively, and having a melt index of 0.1. |
| HDPE | A high density polyethylene having a density of 0.959 g/cc and a melt index of 0.7 |
| ISTA | Isostearic Acid |
| ITIT | Isopropyl Tri-isostearyl Titanate |
| ODTS | Octadecyl Trimethoxy Silane |
| OA | Oleic Acid |
| OTS | Octyl Trimethoxy Silane |
| PFAE | Perfluoroalkyl Polyoxyethylene Ethanol |
| PFAI | Perfluoroalkyl Quaternary Ammonium Iodide |
| PFAP | Perfluoroalkyl polyester |
| PFOA | Perfluorooctanoic Acid Ammonium Salt |
| PP | A polypropylene homopolymer having a density of 0.905 g/cc and melt flow of 5.0 dg/min. |
| STA | Stearic Acid |
| Talc | A natural, asbestos-free magnesium silicate containing 98 percent talc with a mean particle size of 1.5 μm and a surface area of 172/g. |
| TOF | Tri(2-Ethyl Hexyl) Phosphate |
| ZSTA | Zinc Stearate |

EXAMPLE 1 (COMPARATIVE)

Unfilled Polymers

This example demonstrates the typical property profile of the polyethylene and polypropylene polymers used in the subsequent examples, when no filler or interface agent is present.

The high density polyethylene and the polypropylene homopolymer used in the following samples were milled, injection molded and tested except that no filler or interface agents were added. The results were as follows:

| Polymer | TS | TM | FS | FM | Izod | HDT | EB |
| --- | --- | --- | --- | --- | --- | --- | --- |
| HDPE | 2920 | 113 | 3890 | 161 | 13 | 43 | 408 |
| PP | 4308 | 221 | 7052 | 313 | 0.7 | 61 | 43 |

The foregoing data enables comparison with data for the filled polymers in the subsequent examples to illustrate the improved mechanical properties which can be achieved when using selected fillers in combination with the proper impact promoters of this invention.

EXAMPLE 2

ATH/HDPE

This example shows the utility of TOF as an impact promoter for aluminum trihydrate filled HDPE, in comparison to some conventional treatments.

Aluminum Trihydrate (ATH) filled HDPE (50 wt. % filler) samples, the ATH having been preteated with the agents listed below, were prepared and tested with the results being as follows:

| Treating Agent | TS | TM | FS | FM | Izod | HDT | EB |
|---|---|---|---|---|---|---|---|
| None* | 3120 | 279 | 6440 | 447 | 2.0 | 62 | 36 |
| TOF | 3300 | 211 | 4690 | 313 | 9.4 | 49 | 43 |
| ITIT* | 2930 | 180 | 5410 | 294 | 0.8 | 52 | 27 |
| CSTA* | 3340 | 286 | 5140 | 389 | 2.9 | 56 | 68 |
| EDMS* | 3210 | 242 | 6700 | 421 | 3.7 | 54 | 7 |

*Comparative

The data shows that TOF is a most effective impact promoter for this filler/polymer system, increasing the notched Izod strength from two to over nine ft.lbs/inch of notch as compared to the control sample with no treatment agent. This substantial increase in toughness occurs at little expense in strength. The stiffness, although reduced relative to that of the untreated control, is still well above that of the unfilled polymer as seen by comparison with the data in Example 1. In contrast, conventional treatments such as Calcium Stearate or the titanate lubricant ITIT only modestly increase or even reduce the toughness as compared to the untreated filler. EDMS, an ethoxylated dimethyl siloxane fluid with 7-8 ethylene oxide units/molecule, is also superior to CSTA and ITIT. Furthermore, EDMS provides superior retention of composite physical properties after extended exposure to water. This effect is observed also in TOF/EDMS blends enabling formulations which have superior property combinations than those achievable with each material by itself as illustrated in Example 9 below.

EXAMPLE 3

CaCO₃/HDPE

This example shows the utility of dodecylpyridinium chloride as an impact promoter for calcium carbonate filled HDPE, in comparison to other treatments.

The following samples were prepared and tested as in Example 2 except that the filler was $CaCO_3$:

| Treating Agent | TS | TM | FS | FM | Izod | HDT | EB |
|---|---|---|---|---|---|---|---|
| None* | 2290 | 248 | 5110 | 345 | 1.4 | 55 | 34 |
| DDPC | 2780 | 194 | 4720 | 335 | 4.6 | 50 | 29 |
| ODTS* | 3270 | 266 | 6130 | 411 | 2.2 | 57 | 28 |
| PFAE* | 2620 | 215 | 5030 | 395 | 2.1 | 49 | 72 |
| PFOA* | 2660 | 215 | 5240 | 422 | 2.0 | 51 | 55 |

*Comparative

The data shows that DDPC is a superior impact promoter for $CaCO_3$ in HDPE, giving more than a tripling in impact strength as compared to untreated filler with good retention of strength and stiffness, particularly in flexure. The three silane and fluoroalkyl compounds are less beneficial for impact, although other mechanicals are quite good. Again, the combination of DDPC with the latter hydrophobic agents result in impact promoter formulations providing superior water resistance with only minor loss of the excellent impact contribution provided by straight DDPC.

EXAMPLE 4

CaCO₃/HDPE

This example shows the utility of isostearic acid as an impact promoter for calcium carbonate filled HDPE, in comparison to other treatments.

The samples shown in the following table were prepared and tested as described in Example 3:

| Treating Agent | TS | TM | FS | FM | Izod | HDT | EB |
|---|---|---|---|---|---|---|---|
| None* | 2990 | 248 | 5110 | 345 | 1.4 | 55 | 34 |
| ISTA | 2610 | 198 | 5040 | 401 | 4.2 | 49 | 99 |
| OTS* | 2810 | 223 | 5290 | 379 | 2.9 | 54 | 51 |
| EDMS* | 2700 | 208 | 5160 | 357 | 3.0 | 46 | 42 |
| PFAI* | 2610 | 193 | 5050 | 413 | 3.5 | 47 | 75 |

*Comparative

ISTA is shown to be an excellent impact promoter for $CaCO_3$ in HDPE, tripling the impact strength while retaining acceptable strength and stiffness. Two silanes and one fluoroalkyl compound are seen to provide good over-all properties, although the impact improvement is somewhat less than that offered by ISTA. The combination of ISTA with silicones, or fluoroalkyl agents again provides superior water resistance as compared to ISTA by itself. These results are markedly superior to those attainable with STA or metal stearates.

EXAMPLE 5 (COMPARATIVE)

Clay/HDPE

This comparative example demonstrates that isostearic acid is not effective in clay-filled HDPE, as an impact promoter.

These samples were prepared as those of Example 3 except that hydrous clay was used instead of calcium carbonate:

| Treating Agent | TS | TM | FS | FM | Izod | HDT | EB |
|---|---|---|---|---|---|---|---|
| None | 3640 | 265 | 6740 | 508 | 0.7 | 70 | 26 |
| ISTA | 3520 | 281 | 6670 | 569 | 1.1 | 58 | 26 |

The foregoing data shows that ISTA is not effective in clay-filled high density polyethylene in spite of its excellent performance on calcium carbonate in the same polymer, as shown in Example 3.

EXAMPLE 6 (COMPARATIVE)

Talc/HDPE

This comparative example demonstrates that isostearic acid is not an effective impact promoter for talc-filled HDPE.

The samples shown below were prepared as those in Example 4 except that talc was used as the filler:

| Treating Agent | TS | TM | FS | FM | Izod | HDT | EB |
|---|---|---|---|---|---|---|---|
| None | 4160 | 339 | 7600 | 673 | 1.6 | 70 | 33 |
| ISTA | 4170 | 312 | 7540 | 849 | 1.2 | 65 | 33 |
| ZSTA | 4120 | 333 | 7770 | 639 | 1.4 | 77 | 5 |

The foregoing data shows that ISTA is no better than zinc stearate when used on talc in the same polymer as before, again illustrating the surprising specificity of the non-reactive impact promoters of this invention.

EXAMPLE 7 (COMPARATIVE)

ATH/PP

This comparative example demonstrates that tri (2-ethylhexyl) phosphate is not an effective impact promoter for ATH-filled polypropylene.

These samples were prepared as those in Example 3 except that polypropylene was used as the polymer:

| Treating Agent | TS | TM | FS | FM | Izod | HDT | EB |
|---|---|---|---|---|---|---|---|
| TOF | 3270 | 272 | 5940 | 384 | 0.8 | 65 | 6 |
| STA | 3210 | 307 | 6050 | 479 | 0.8 | 69 | 61 |
| CSTA | 3230 | 314 | 6180 | 504 | 0.9 | 66 | 24 |

The foregoing data shows again the surprising specificity of the impact promoters. In spite of the excellent performance in ATH-filled HDPE as shown in Example 2, TOF is no better than stearic acid or calcium stearate in ATH-filled polypropylene.

EXAMPLE 8 (COMPARATIVE)

$CaCO_3$/PP

This comparative example shows that isostearic acid is not an effective impact promoter for calcium carbonate-filled polypropylene.

The samples shown below were prepared as described in Example 4 except that polypropylene was used as the polymer:

| Treating Agent | TS | TM | FS | FM | Izod | HDT | EB |
|---|---|---|---|---|---|---|---|
| None | 4065 | 266 | 6885 | 402 | 0.5 | 72 | 33 |
| ISTA | 2520 | 220 | 5930 | 437 | 0.5 | 76 | 98 |

Again it is seen that, although ISTA is an excellent impact promoter for $CaCO_3$ in HDPE as shown in Example 4, it is quite ineffective with the same filler in polypropylene homopolymer.

EXAMPLE 9

ATH/HDPE

This example shows that by using both an impact promoter and a hydrophobic agent in accordance with the present invention, an ATH mineral-filled composition can be obtained which will have a reduced sensitivity to moisture, along with good mechanical properties.

ATH (50 wt %) was compounded into HDPE by the same procedure as in Example 2 except that the samples were sheeted off the mill (10 mils thickness) and allowed to cool to room temperature instead of being injection molded.

In addition to the ATH, samples were prepared containing TOF an an impact promoter, EDMS as a hydrophobic agent, and both TOF and EDMS, as shown below where the percentages are by weight based upon the weight of the ATH. Strips of the various formulations were then immersed in 95° C. water for 7 days, after which they were removed, allowed to cool to room temperature, and manually inspected with the following results:

| Treating Agent 1 | Treating Agent 2 | Mechanicals After Water Aging |
|---|---|---|
| None | None | Brittle |
| TOF (2%) | None | Brittle |
| EDMS (2%) | None | Flexible |
| TOF (1.8%) | EDMS (0.2%) | Fairly Flexible |

The foregoing demonstrates that beneficial water resistance can be obtained by the addition of EDMS, even as a minor component, to ATH-filled polyethylene. At this level, no discernible effect on mechanicals were seen before water exposure.

EXAMPLE 10

$CaCO_3$/HDPE

This example shows that by using both an impact promoter and a hydrophobic agent in accordance with the present invention, a $CaCO_3$ mineral-filled composition can be obtained which will have a reduced sensitivity to moisture, along with good mechanical properties.

$CaCO_3$ was compounded into HDPE and tested as described in Example 9 except that the hot water exposure was for 48 hours. In addition to the $CaCO_3$, samples were prepared containing ISTA as an impact promoter, PFAP as a hydrophobic agent, and both $CaCO_3$ and PFAP, as shown below where the percentages are by weight based upon the weight of the $CaCO_3$. The results were as follows:

| Treating Agent 1 | Treating Agent 2 | Mechanicals After Water Aging |
|---|---|---|
| None | None | Brittle |
| ISTA (2%) | None | Fairly Brittle |
| PFAP (2%) | None | Very Flexible |
| ISTA (1.8%) | PFAP (0.2%) | Flexible |

Again, the beneficial effect of PFAP is obtained even when used as a minor component together with ISTA in polyethylene. No impairment of mechanicals over straight ISTA was observed before water exposure.

EXAMPLE 11

$BaTiO_3$/EVA

This example shows that EVA containing barium titanate as a mineral filler may have its ductility increased by the addition of isostearic acid.

The samples listed below were prepared as follows: 1000 g of $BaTiO_3$ powder was charged to a laboratory blender to which was added 70 g of one of the liquid additives listed below. After 15 minutes of mixing, 940 g of the treated $BaTiO_3$ was removed for later use. Separately, 60 g of EVA resin was fluxed on a 6×12 inch two-roll mill at a roll temperature of 180° F. After the resin had softened sufficiently, the 940 g of treated $BaTiO_3$ (or 875 g in case of untreated $BaTiO_3$) was incrementally added on the mill until a coherent mixture was obtained. The hot blend was then fed to an "inverted L" 8×6 inch four roll calender operated at the following roll temperatures: offset roll 180° F., top roll 185° F., middle roll 190° F. and bottom roll 195° F. The processability and resulting film quality (5 mil thickness) are shown below:

| Treating Agent | Processability | Film Quality |
| --- | --- | --- |
| None | Not Processable | No Film |
| ISTA | Good | Flexible |
| STA* | Poor | Brittle |
| OA | Poor | Brittle |

*(pre-heated blender)

In spite of the extremely high filler loadings, the ISTA-formulation produced a flexible film that could be wound and handled without difficulty. In contrast, the STA and OA-containing films could be made only with great difficulty and produced very fragile films with many defects. The control sample without any filler treatment resulted in such a "dry" mix that no film could be made.

The example shows another case of specific efficacy of ISTA. BaTiO$_3$ films with minimum binder contents are useful in the manufacture of electronic components such as ceramic capacitors. Since the products are pyrolyzed and fired in later fabrication steps, a low content of organic binder is desirable to minimize gas formation with associated risks of generating porosity in the final ceramic products.

The foregoing examples illustrate, for mineral-filled polyethylene, the excellent improvements in impact strength with good retention of tensile strength and stiffness (flexural modulus) which can be obtained by the selection of the specific impact promoters in accordance with this invention, depending upon the particular mineral filler which is present.

The examples further show that by the specific use of isostearic acid in ethylene-vinyl acetate compositions which are filled with barium titanate or neodymium titanate, an improvement in the ductility of the filled composition can be achieved in accordance with the present invention. Combinations of the straight impact promoters with selected hydrophobic agents, which in themselves show good mechanical response, provide impact promoter blends which lend superior water resistance to the filled polymer systems. The examples show also that these effects are quite specific to the individual, selected filler/polymer systems, for which the treating agents were developed.

What is claimed is:

1. A method for improving the impace strength of a composition, wherein said composition comprises polyethylene and a pretreated mineral filler selected from the group consisting of aluminum trihydrate and magnesium hydrate, said method comprising incorporated into said composition a pretreated filler containing from about 0.5 to about 10 percent, based on the weight of the filler of tri(2-ethylhexyl)phosphate.

2. The composition of claim 1 wherein the mineral filler is aluminum trihydrage.

3. The composition of claim 2 wherein the polyethylene is high-density polyethylene having a density of about 0.94 to about 0.96 and a melt index of about 0.01 to about 50.

4. The composition of claim 3 further comprising a hydrophobic agent which is present in a sufficient amount to reduce the moisture sensitivity of the composition.

5. The composition of claim 2 wherein the polyethylene is high-pressure, low-density polyethylene havinq a density of about 0.91 to about 0.94 and a melt index of about 0.1 to about 50.

6. The composition of claim 5 further comprising a hydrophobic agent which is present in a sufficient amount to reduce the moisture sensitivity of the composition.

7. The composition of claim 2 wherein the polyethylene is linear, low-density polyethylene having a density of about 0.90.to about 0.94 and a melt index of about 0.01 to about 50.

8. The composition of claim 7 further comprising a hydrophobic agent which is present in a sufficient amount to reduce the moisture sensitivity of the composition.

9. The composition of claim 1 wherein the mineral filler is magnesium hydrate.

10. The composition of claim 9 wherein the polyethylene is high-density polyethylene having a density of about 0.94 to about 0.96 and a melt index of about 0.01 to about 50.

11. The composition of claim 10 further comprising a hydrophobic agent which is present in a sufficient amount to reduce the moisture sensitivity of the composition.

12. The composition of claim 9 wherein the polyethylene is high-pressure, low-density polyethylene having a density of about 0.91 to about 0.94 and a melt index of about 0.1 to about 50.

13. The composition of claim 12 further comprising a hydrophobic agent which is present in a sufficient amount to reduce the moisture sensitivity of the composition.

14. The composition of claim 9 wherein the polyethylene is linear, low-density polyethylene having a density of about 0.90 to about 0.94 and a melt index of about 0.01 to about 50.

15. The composition of claim 14 further comprising a hydrophobic agent which is present in a sufficient amount to reduce the moisture sensitivity of the composition.

16. The method of claim 1 also comprising incorporating into said composition a sufficient amount of hydrophobic agent to reduce the moisture sensitivity of the composition.

* * * * *

UNITED STATES PATENT AND TRADEMARK OFFICE
CERTIFICATE OF CORRECTION

PATENT NO. : 4,661,537

DATED : 4/28/87

INVENTOR(S) : Ancker et al

It is certified that error appears in the above-identified patent and that said Letters Patent is hereby corrected as shown below:

Claim 1, line 1, please delete "impace" and insert therefor--impact--.

Claim 2, line 2, please delete "trihydrage" and insert therefor--trihydrate--.

Claim 7, line 3, please delete " 0.90." and insert therefor-- 0.90--.

Signed and Sealed this

Eighth Day of March, 1988

Attest:

DONALD J. QUIGG

Attesting Officer

Commissioner of Patents and Trademarks